United States Patent Office 3,719,716
Patented Mar. 6, 1973

3,719,716
PROCESS OF MAKING DIFLUOROCHLORO-
BROMOMETHANE
Heinrich Paucksch, Langenhagen, and Joachim Massonne, Hannover, Germany, assignors to Kali-Chemie Aktiengesellschaft, Hannover, Germany
No Drawing. Filed Sept. 4, 1970, Ser. No. 69,953
Claims priority, application Germany, Sept. 13, 1969, P 19 16 509.1
Int. Cl. C07c 17/10, 17/20
U.S. Cl. 260—653                         2 Claims

ABSTRACT OF THE DISCLOSURE

Difluoromonochloromethane is reacted with an excess of bromine at a temperature between 300 and 600° C. and the difluorochlorobromomethane is then recovered after removing the unreacted bromine and the formed hydrogen bromide. The recovery is effected by fractional distillation. In this process difluorodibromomethane is an undesirable by-product. This by-product is reconverted to difluorochlorobromomethane by reacting it with chlorine at a temperature in excess of 200° C. The reaction can be effected in a separate reaction vessel or by passing the difluorodibromomethane back into the main reaction mixture together with an added amount of chlorine. Chlorination is effected at temperatures between 300 and 600° C. during a reaction time between about 0.5 and 10 seconds with specific adjustments of the molar ratio of the difluorodibromomethane to chlorine.

BACKGROUND OF THE INVENTION

The present invention relates to an improvement of the process wherein difluorochlorobromomethane is made by thermal bromination of difluoromonochloromethane.

As disclosed in Patent 2,731,505, difluorochlorobromomethane can be made by reacting difluoromonochloromethane with bromine at temperatures between about 300 and 650° C. The difluorochlorobromomethane is recovered from the reaction product by fractional distillation after separation of the hydrogen bromide and the unreacted bromine. In order to obtain an adequate reaction speed the bromination should be carried out a temperatures between 400 and 600° C. and the bromine should be employed in an excess above the stoichiometric amount. The main reaction develops according to equation $$CHF_2Cl + Br_2 \rightarrow CF_2ClBr + HBr \qquad (I)$$

Unfortunately, a secondary reaction also takes place to a substantial extent, for instance according to the equation $$CHF_2Cl + Br_2 \rightarrow CF_2Br_2 + HCl \qquad (II)$$

Depending on the reaction conditions, the crude product obtained in the reaction may contain from 8 to 20% by weight of difluorodibromomethane, which has to be separated in an additional operation step. The formation of difluorodibromomethane is normally an undesired side reaction, since it reduces the yield of difluorochlorbromomethane and thus impairs the economics of the process.

SUMMARY OF THE INVENTION

The improvement of the prior-art process provided by the present invention is based on the finding that difluorodibromomethane can be converted by reaction with chlorine to difluorochlorobromomethane at temperatures as low as 200° C. following the equation $$CF_2Br_2 + \tfrac{1}{2}Cl_2 \rightarrow CF_2ClBr + \tfrac{1}{2}Br_2 \qquad (III)$$

Preferably, the chlorination reaction is effected at a temperature between 300 and 600° C. and during a reaction time of about 0.5 to 10 seconds. It may be carried out by passing the difluorodibromomethane to a separate reaction vessel where it is reacted with chlorine at a molar ratio of difluorodibromomethane to chlorine between 1:0.1 and 1:2.0. It is also possible to pass the difluorodibromomethane back into the main bromination reaction together with an added amount of chlorine to provide for a molar ratio of chlorine to the mixture formed in the reaction of $CF_2Br_2$ and $CHF_2Cl$ between 0.1:1 and 0.6:1.

DETAILED DESCRIPTION OF THE INVENTION AND OF PREFERRED EMBODIMENTS

In both alternative operations summarized above, it is possible to keep the amount of difluorodibromomethane which is circulated at a constant level by carefully selecting the reaction conditions, such as residence time, temperature and molar ratio of the individual components, within the general range. Apart from small amounts of other alkyl halides, the final product in the reaction will all be difluorochlorobromomethane.

Regarding the chlorination temperature, the speed of reaction is comparatively low at 200° C., but increases rapidly with increasing temperature. At temperatures between 300 and 500° C. and reaction times between 0.5 and 10 seconds, and preferably between 0.8 and 3 seconds, a very substantial conversion will be accomplished to the desired difluorochlorobromomethane.

Temperatures in excess of 600° C. are less suitable since at these temperatures a decrease of the yield occurs because of the formation of by-products.

It has furthermore been found that particularly high yields can be obtained if the molar ratio of difluorodibromomethane to chlorine is not too high, since otherwise the chlorination will result in increasing amounts of higher chlorinated products, as appears for instance from the equation $$CF_2ClBr + \tfrac{1}{2}Cl_2 \rightarrow CF_2Cl_2 + \tfrac{1}{2}Br_2 \qquad (IV)$$

Particularly preferred is the molar ratio of $Cl_2:CF_2Br_2$ between 0.1:1 and 2.0:1. The preferred range is between 0.2:1 and 0.4:1. In the preferred molar ratio range yields of 85–95% of difluorochlorobromomethane can be obtained from reactions involving 30–60 vol.-percent of the employed difluorodibromomethane.

By carefully selecting the reaction conditions it is thus possible to keep the amount of difluorodichloromethane at a low level.

The reaction between difluorodibromomethane and chlorine in a separate reaction vessel can for instance be carried out in a nickel or Monel tubular reactor which is charged with inactive $Al_2O_3$.

According to a feature of the invention, the reaction mixture which is obtained in the chlorination step and which comprises $CF_2ClBr$, small amounts of $CF_2Cl_2$, bromine and unreacted $CF_2Br_2$ and chlorine is united with the reaction product from the main bromination reaction. The total mixture is then separated in conventional manner into its individual components. The combining of the two gas mixtures has the advantage that the processing of the total reaction product is simplified. Chlorine, which is present in the reaction mixture will react immediately after combining the reaction gases with HBr to form HCl and bromine. The residual chlorine from the chlorination reaction thus will help to reform bromine from the hydrogen bromide and thus to make it available for the further bromination reaction.

After separating out the inorganic compounds, the separation of the halogenated compounds can be effected without difficulty in a fractionating column. The difluorochlorobromomethane is blown off at the head of the column while the difluorodibromomethane is obtained as the bottoms product. By proper selection of the reaction speed of the bromination and chlorination reaction, an equilibrium between the two reactions can be obtained with the result that in the end the only reaction product obtained will be difluorochlorobromomethane.

It has also been found that the reaction between the difluorodibromomethane and the chlorine does not necessarily have to be carried out in a separate reaction vessel. It can also be effected simultaneously with the bromination reaction.

This can be accomplished by recycling the difluorodibromomethane which is obtained as by-products into the main reaction together with the necessary amounts of difluoromonochloromethane and bromine and adding chlorine in an amount such that the molar ratio of $Cl_2:(CF_2Br_2+CHF_2Cl)$ is between 0.1:1 and 0.6:1.

The bromination reaction can be effected at the conditions which usually are observed in bromination reactions, that is at temperatures between 300 and 600° C. and with a molar excess of bromine up to 2.5 times the molar amount and with a reaction period between 0.5 and 10 seconds.

Preferably, the reaction temperature is between 400 and 600° C. and the reaction time between 0.8 and 3 seconds.

By recycling the difluorodibromomethane and simultaneously introducing chlorine, the chlorination of difluorodibromomethane and the conversion of hydrogen bromide to bromine takes place along with the main bromination reaction. The stoichiometric ratio for both reactions is $Cl_2:(CF_2Br_2+CHF_2Cl)=0.5:1$.

If too much of chlorine is used, difluorodichloromethane may be formed along with the desired difluorochlorobromomethane. The preferred molar ratio is between 0.2:1 and 0.4:1 between $Cl_2$ and above mixture.

By properly selecting the reaction conditions it is possible to keep the amount of difluorodibromomethane at the same level prior and consequent to the reaction and thus permitting it to be circulated. During the reaction only the desired difluorochlorobromomethane is obtained apart from small amounts of unreacted difluoromonochloromethane and other alkyl halides. It is thus possible to obtain a conversion of difluoromonochloromethane in an amount in excess of 96% and a yield of difluorochlorobromomethane in an amount in excess of 90% relative to the conversion of difluoromonochloromethane.

The following examples will further illustrate the invention:

Example 1

The purpose of this example was to show the relation between yield of difluorochlorobromomethane and the by-product constituted by difluorodibromomethane and the reaction conditions observed in the reaction between difluorodibromomethane and chlorine.

The reaction in this case was carried out in a nickel tube which was heated externally by electrical means from a tubular oven and was charged with fractionated $Al_2O_3$. $Cl_2$ and $CF_2Br_2$, the latter obtained from the products of the bromination operation, were passed through the nickel tube in varying amount ratios and for different residence times and at different temperatures. The reaction products were then subjected to an alkaline washing and subsequently to gas chromatographic analysis. The individual conditions of the tests and compositions of the gases appear from the following Table 1.

TABLE 1

| Test number | 1 | 2 | 3 |
|---|---|---|---|
| $CF_2Br_2$ (mole/h.) | 1.25 | 1.07 | 1.07 |
| $Cl_2$ (mole/h.) | 0.25 | 0.43 | 0.43 |
| Temperature (° C.) | 450 | 400 | 450 |
| Residence time (sec.) | 1.05 | 1.13 | 1.05 |
| Reaction products obtained (vol. percent): | | | |
| $CF_2Cl_2$ | 2.5 | 0.5 | 7.1 |
| $CF_2ClBr$ | 31.1 | 18.4 | 44.9 |
| $CF_2Br_2$ | 66.4 | 81.1 | 47.9 |

The total reaction products thus obtained in the chlorination operation were then mixed with the reaction product obtained from the bromination without prior separation of the different halides. The total mixture of gaseous reaction products was then subjected to further processing and the thus-obtained difluorodibromomethane was then again passed into the reaction vessel for chlorination.

Example 2

These tests illustrate the carrying out of the reaction between the difluorodibromomethane and the chlorine simultaneously with the main reaction between difluoromonochloromethane and bromine under various reaction conditions.

The apparatus was the same as in Example 1. There were fed into the apparatus simultaneously $CHF_2Cl$, $CF_2Br_2$, $Br_2$ and $Cl_2$ and the final reaction products were then subjected to a gas chromatographic analysis after an alkaline washing step. Table 2, which follows, is a summary of the test conditions and the compositions of the gases after washing.

TABLE 2

| Test number | 1 | 2 | 3 |
|---|---|---|---|
| $CHF_2Cl$ (mole/h.) | 0.375 | 0.375 | 0.375 |
| $CF_2Br_2$ (mole/h.) | 0.065 | 0.238 | 0.238 |
| $Br_2$ (mole/h.) | 0.385 | 0.625 | 0.531 |
| $Cl_2$ (mole/h.) | 0.156 | 0.070 | 0.115 |
| Temperature (° C.) | 550 | 555 | 555 |
| Total reaction product (vol. percent): | | | |
| $CHF_2Cl$ | 4.6 | 4.9 | 3.5 |
| $CF_2Cl_2$ | 3.2 | 1.8 | 7.2 |
| $CHF_2Br$ | 2.2 | 5.6 | 1.9 |
| $CF_2ClBr$ | 62.6 | 64.0 | 62.4 |
| $CF_2ClCF_2Br$ | 0.6 | 0.8 | 0.9 |
| $CF_2Br_2$ | 26.8 | 22.9 | 24.1 |

Example 3

In a pilot plant for production of $CF_2ClBr$ in a reactor (I) 10 mole/h. $CHF_2Cl$ are reacted with 18 mole/h. bromine at a temperature of 500° C. A sample of the total reaction product was then subjected to an alkaline washing and subsequently to gas chromatographic analysis. The composition of the gas appears from the following Table 3.

TABLE 3

| Total reaction product: | Mole/h. |
|---|---|
| $CF_2ClBr$ | 8.25 |
| $CF_2Br_2$ | 1.14 |
| $CHF_2Cl$ | 0.34 |
| $CF_2Cl_2$ | 0.04 |
| $CHF_2$ | 0.17 |
| $CF_2ClCF_2Br$ | Traces |
| $CF_2BrCF_2Br$ | 0.06 |

Simultaneously in a reactor (II) 2.85 mole/h. $CF_2Br_2$ are reacted with 1.10 mole/h. chlorine at a temperature of 450° C. A sample of the total reaction product was then subjected to an alkaline washing and subsequently to gas chromatographic analysis. The composition of the gas appears from the following Table 4.

TABLE 4

| Total reaction product: | Mole/h. |
|---|---|
| $CF_2Cl_2$ | 0.11 |
| $CF_2ClBr$ | 1.03 |
| $CF_2Br_2$ | 1.71 |

In the second reaction the conversion of $CF_2Br_2$ amounted 1.14 mole/h. (40% by vol.). The unreacted $CF_2Br_2$ amounted 1.71 mole/h. The conversion of $CF_2Br_2$ in reactor 2 corresponded with the amount of $CF_2Br_2$ formed in reactor 1. The equilibrium between the two reactions was thus obtained.

Both reaction products were mixed and then subjected to further processing like alkaline washing, drying and separation by fractionating distillation.

At the top of the distillation column 9.28 mole/h. of $CF_2ClBr$ were received, while at the bottom 2.85 mole/h.

of $CF_2Br_2$ are collected. This $CF_2Br_2$ was again recycled to reactor 2 for chlorination. The only reaction product obtained was $CF_2ClBr$.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In the process of making difluorochlorobromomethane in a continuous operation by reacting difluoromonochloromethane with an excess of bromine up to 2.5 times of the molar amount at a temperature between 300 and 650° C. followed by removal of unreacted bromine and the formed hydrogen bromide from the effluent gas and recovery of the difluorochlorobromomethane by fractional distillation from the remaining mixture, the improvement comprising separating the difluorodibromomethane which forms as a by-product in the above bromination reaction and continuously recycling the same into the said bromination reaction together with an added amount of chlorine to provide for a molar ratio of chlorine to the formed mixture of $CF_2Br_2$ and $CHF_2Cl$ between 0.1:1 and 0.6:1, and effecting the bromination reaction for a time of 0.5 to 10 seconds at a temperature between 300 and 600° C.

2. The process of claim 1, wherein the molar ratio of chlorine to the mixture of $CF_2Br_2$ and $CHF_2Cl$ is between 0.2:1 and 0.4:1, the reaction temperature is between 400 and 600° C. and the reaction time is between 0.8 and 3 seconds.

References Cited

UNITED STATES PATENTS 3,558,723    1/1971    Davis et al. _____ 260—653

DANIEL D. HORWITZ, Primary Examiner